United States Patent
Kitajima et al.

(10) Patent No.: US 12,122,650 B2
(45) Date of Patent: *Oct. 22, 2024

(54) LIFT CARRIER

(71) Applicant: TOYOTA JIDOSHA KABUSHIKI KAISHA, Toyota (JP)

(72) Inventors: Toshiki Kitajima, Mishima (JP); Norinao Watanabe, Susono (JP); Yutaka Nakamura, Susono (JP); Naoya Kajita, Toyota (JP); Kenji Nakano, Toyota (JP); Takafumi Sannomiya, Okazaki (JP); Yasutada Shimizu, Okazaki (JP); Kohei Yasuda, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,166

(22) Filed: Oct. 30, 2023

(65) Prior Publication Data

US 2024/0059534 A1 Feb. 22, 2024

Related U.S. Application Data

(63) Continuation of application No. 17/828,586, filed on May 31, 2022, now Pat. No. 11,834,313.

(30) Foreign Application Priority Data

Jul. 5, 2021 (JP) .................................. 2021-111593

(51) Int. Cl.
*E04H 6/36* (2006.01)
*B60S 13/02* (2006.01)
(Continued)

(52) U.S. Cl.
CPC ................ *B66F 7/16* (2013.01); *B60S 13/02* (2013.01); *B66F 7/28* (2013.01); *E04H 6/36* (2013.01); *B66F 2700/12* (2013.01)

(58) Field of Classification Search
CPC .......... B62B 3/0618; E04H 6/06; B60V 3/025
See application file for complete search history.

(56) References Cited

U.S. PATENT DOCUMENTS 3,592,285 A 7/1971 Noble
3,669,292 A 6/1972 Tuura
(Continued)

FOREIGN PATENT DOCUMENTS

JP 2019078099 A 5/2019

OTHER PUBLICATIONS

Notice of Allowance dated Sep. 18, 2023, Issued to U.S. Appl. No. 17/828,586, filed May 31, 2022.

*Primary Examiner* — Mark C Hageman
(74) *Attorney, Agent, or Firm* — Dinsmore & Shohl LLP

(57) ABSTRACT

A carrier body of a lift carrier includes: a pair of wheel support mechanisms that supports a first wheel of a vehicle to be transported; a frame-shaped structure connected to the wheel support mechanisms; and one or more lifting units that lift or lower the pair of wheel support mechanisms. The frame-shaped structure includes a frame portion and an upper plate and is open on a lower side of the carrier body. Each of the lifting units includes a wheel support and an air spring. The air spring is interposed between the wheel support and an upper plate. As the air spring expands, the wheel support is rotated about one end of the wheel support rotatably supported by the frame portion, and is deployed out of the frame-shaped structure.

19 Claims, 7 Drawing Sheets

(51) Int. Cl.
*B66F 7/16* (2006.01)
*B66F 7/28* (2006.01)

(56) References Cited

U.S. PATENT DOCUMENTS

| | | |
|---|---|---|
| 3,829,116 A | 8/1974 | Burdick |
| 3,831,708 A | 8/1974 | Terry |
| 8,950,522 B1 | 2/2015 | Lenkman |
| 10,273,704 B2 | 4/2019 | Wastel |
| 10,315,899 B2 | 6/2019 | Smit et al. |
| 10,590,669 B2 | 3/2020 | Boussard |
| 11,607,984 B2 | 3/2023 | Kajita |
| 2022/0073330 A1 | 3/2022 | Cord |

LIFT CARRIER

CROSS-REFERENCE TO RELATED APPLICATIONS

This application is a continuation application of co-pending U.S. patent application Ser. No. 17/828,586 filed on May 31, 2022, which claims priority to Japanese Patent Application No. 2021-111593 filed on Jul. 5, 2021, which are incorporated herein by reference in their entirety.

BACKGROUND

1. Technical Field

The present disclosure relates to lift carriers for transporting a vehicle.

2. Description of Related Art

Japanese Unexamined Patent Application Publication No. 2019-78099 (JP 2019-78099 A) discloses a lift carrier for a vehicle. This lift carrier includes: a carrier frame that supports a vehicle to be transported; and a base end lifting portion and a tip end lifting portion that lift and lower the carrier frame in order to lift and lower the vehicle. More specifically, the lift carrier includes a predetermined number of arm portions that support each tire of the vehicle when the carrier frame is inserted under the vehicle. The arm portions are supported by the carrier frame via arm support portions.

SUMMARY

When the vehicle to be transported is lifted and lowered by the base end lifting portion and the tip end lifting portion (lifting unit) described in JP 2019-78099 A, a large force is applied between the lifting unit and the arm support portions (wheel support mechanisms) supporting the tires (wheels) of the vehicle. In order to lift and lower the vehicle, it is necessary to insert the lifting unit into a narrow space between the vehicle and the road surface. It is therefore desired to provide sufficient rigidity around the lifting unit while making the lifting unit compact.

The present disclosure was made in view of the above problems, and the present disclosure provides a lift carrier that can provide sufficient rigidity around a lifting unit while making the lifting unit compact.

A lift carrier according to an aspect of the present disclosure includes a carrier body that lifts, from a road surface, a vehicle to be transported and supports the vehicle. The carrier body comprises: a pair of wheel support mechanisms that supports a first wheel, the first wheel being two wheels of the vehicle that are right and left wheels of the vehicle; a frame-shaped structure connected to the pair of wheel support mechanisms, the frame-shaped structure being a part of a structure of the carrier body; and one or more lifting units that lift or lower the pair of wheel support mechanisms via the frame-shaped structure. The frame-shaped structure includes a frame portion and an upper plate located on an upper side of the carrier body and covering the frame portion, the frame-shaped structure being open on a lower side of the carrier body. Each of the one or more lifting units includes a wheel support and an air spring. The wheel support includes one end rotatably supported by the frame portion and another end to which a second wheel is connected, and the wheel support is configured to be housed, together with the second wheel, inside the frame-shaped structure, the second wheel being one or more wheels of the carrier body. The air spring is interposed between the wheel support and the upper plate, and expands and contracts according to a pressure of compressed air supplied to the air spring. As the air spring expands, the wheel support is rotated about the one end and is, together with the second wheel, deployed out of the frame-shaped structure.

In the lift carrier according to the above aspect, the one or more lifting units may be a pair of lifting units corresponding to the pair of wheel support mechanisms and arranged next to each other in a lateral direction of the carrier body. The frame-shaped structure may include a reinforcing member extending in a longitudinal direction of the carrier body between the pair of lifting units and connecting a front part of the frame portion and a rear part of the frame portion in the longitudinal direction.

In the lift carrier according to the above aspect, the wheel support may include a bottom wall to which one end of the air spring is fixed, and a side wall surrounding the air spring. The second wheel may be connected to the side wall of the wheel support.

In the lift carrier according to the above aspect, the wheel support may include a wheel unit, the wheel unit including the second wheel, a wheel axle of the second wheel, and a wheel axle support member that supports the wheel axle. The wheel unit may be fastened to a wheel fastening wall by a fastener, the wheel fastening wall being a part of the side wall of the wheel support.

In the lift carrier according to the above aspect, the wheel fastening wall may be in a shape of a rectangular parallelepiped extending in a direction of the wheel axle. The wheel axle support member may have a U-shape including an upper wall, a side wall, and a bottom wall, as viewed in a sectional view perpendicular to the wheel axle, the upper wall being in contact with an upper surface of the wheel fastening wall, the side wall being in contact with an outer side surface of the wheel fastening wall, and the bottom wall being in contact with a bottom surface of the wheel fastening wall. The fastener may include a first fastener that fastens at least one of the upper wall and the bottom wall of the wheel axle support member to the wheel fastening wall, and a second fastener that fastens the side wall of the wheel axle support member to the wheel fastening wall.

In the lift carrier according to the above aspect, the first fastener may fasten the upper wall of the wheel axle support member to the wheel fastening wall.

In the lift carrier according to the above aspect, the wheel support may further include a stopper that is located at the one end of the wheel support rotatably supported by the frame portion, and the stopper engages with the frame portion when a rotation angle of the wheel support with respect to the frame-shaped structure reaches a predetermined angle as the air spring expands.

According to the one or more lifting units included in the lift carrier according to an aspect of the present disclosure, the wheel support supporting the one end of the air spring has one end that is rotatably supported by the frame portion of the strong frame-shaped structure which is a part of the structure of the carrier body. The other end of the wheel support is connected to the second wheel. The wheel support is configured to be housed inside the frame-shaped structure. As the air spring expands, the wheel support is rotated about the one end of the wheel support, and is, together with the second wheel, deployed out of the frame-shaped structure. This structure can provide sufficient rigidity around the one or more lifting units while making the one or more lifting units compact.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described below with reference to the drawings. The same elements are denoted with the same signs throughout the drawings, and repetitive description thereof will be omitted or simplified. When the number, quantity, amount, range, etc. of each element are mentioned in the following embodiment, the technical idea of the present disclosure is not limited to the mentioned numerical values unless otherwise specified or unless the number, quantity, amount, range, etc. of the element are obviously limited to the mentioned numerical values in principle. Structures etc. that will be described in the following embodiment are not necessary to the technical idea of the present disclosure unless otherwise specified or unless structures etc. are obviously limited to the mentioned structures etc. in principle.

1. Configuration of Lift Carrier

Figure 1:
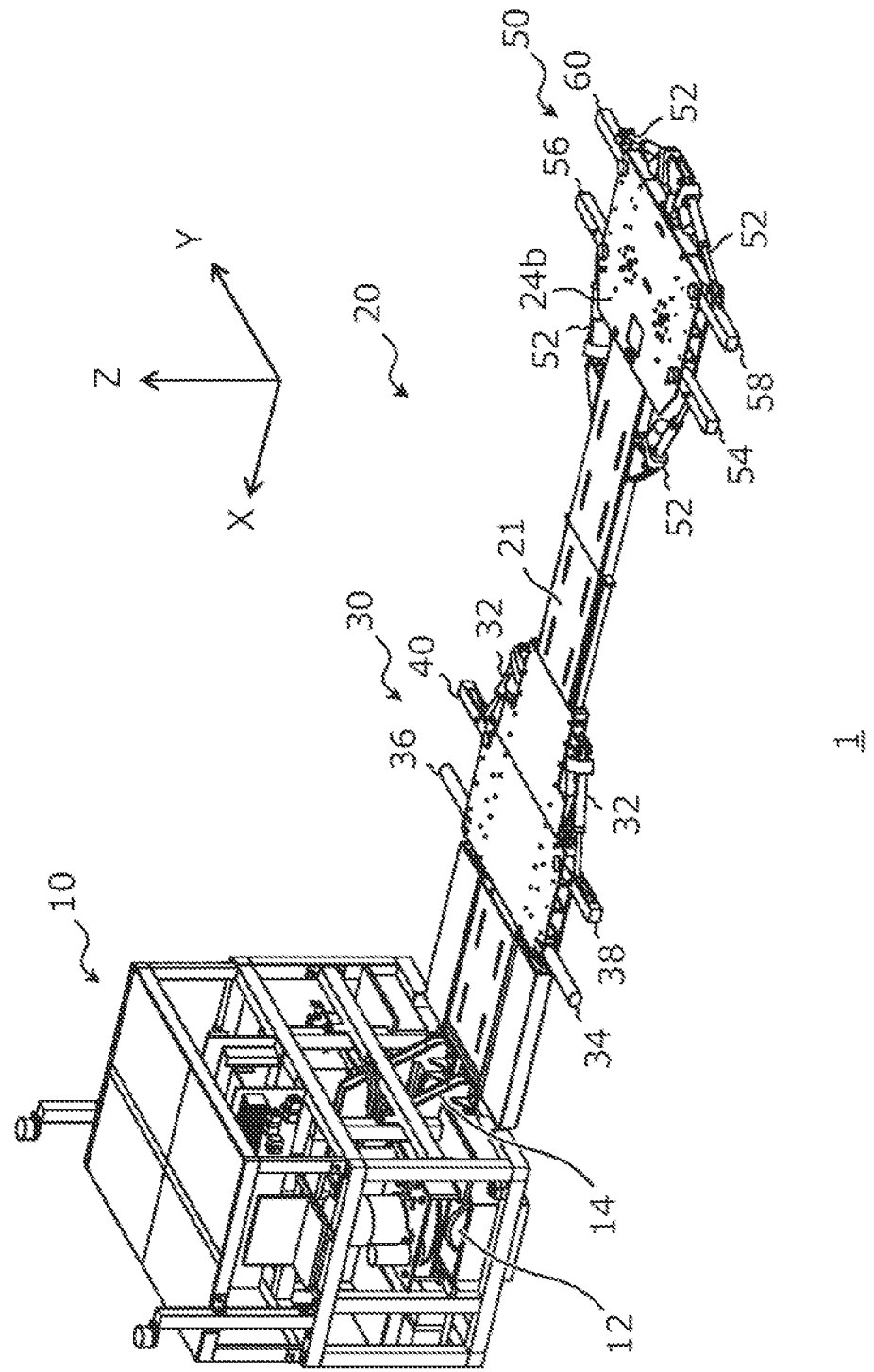
FIG. 1 is a perspective view showing a configuration of a lift carrier according to an embodiment.

FIG. 1 is a perspective view showing a configuration of a lift carrier 1 according to the embodiment. In the example shown in FIG. 1, the lift carrier 1 is configured to transport a four-wheeled vehicle. The lift carrier 1 includes a travelling unit 10 and a carrier body 20 including a carrier frame 21.

The travelling unit 10 is connected to a front end portion of the carrier frame 21 and functions as a travelling device that tows and moves the carrier body 20. That is, in the lift carrier 1, the travelling unit 10 corresponds to a tractor unit, and the carrier body 20 corresponds to a trailer unit. The lift carrier 1 moves in the longitudinal direction of the carrier frame 21. In the following description, the direction of movement of the lift carrier 1 (longitudinal direction of a vehicle) is defined as X direction, the lateral direction of the lift carrier 1 (lateral direction of the vehicle) is defined as Y direction, and the vertical direction of the lift carrier 1 is defined as Z direction.

The travelling unit 10 includes, for example, a drive device, a braking device, and a steering device. The drive device is, for example, an electric motor, and the electric motor drives front carrier wheels 12. Two front carrier wheels 12 are arranged in the Y direction. The braking device applies braking force to the front carrier wheels 12. The steering device controls the turning angle of the front carrier wheels 12. The configuration for the travelling unit 10 to function as a travelling device is not particularly limited, and a known configuration is applied.

The travelling unit 10 includes a first lifting device 14 and has a function to lift and lowers the carrier frame 21. The first lifting device 14 lifts and lowers the front end portion of the carrier frame 21. More specifically, in the example of the lift carrier 1, the carrier frame 21 is lifted and lowered by the first lifting device 14 and a second lifting device 70 (a pair of lifting units 72) included in the carrier body 20. The second lifting device 70 will be described later. The configuration of the first lifting device 14 is not particularly limited. The first lifting device 14 may use, for example, a hydraulic cylinder or an air pressure to lift or lower the carrier frame 21.

The travelling unit 10 further includes a power source and a control device that are not explicitly shown in FIG. 1. The power source supplies power to various actuators included in the lift carrier 1. The power source is, for example, a battery, and is electrically connected to each of the actuators by a wire harness.

The control device outputs control signals for controlling the various actuators included in the lift carrier 1. The actuators operate according to the control signals. For example, the control device is electrically connected to each of the actuators by a wire harness. The control device may be provided outside the lift carrier 1. More specifically, the control device may be configured to transmit control signals to the actuators using wireless communication. The travelling unit 10 may be configured to move the carrier body 20 by remote control or autonomous travelling.

The carrier body 20 includes a first arm group 30 and a second arm group 50. The lift carrier 1 inserts the carrier frame 21 under a vehicle 2 to be transported (hereinafter sometimes simply referred to as the "vehicle") in the longitudinal direction of the vehicle 2 (X direction) (see, e.g., FIG. 4 that will be described later). The lift carrier 1 then supports the vehicle 2 by holding front wheels 3 and rear wheels 4 of the vehicle using the first arm group 30 and the second arm group 50, respectively. As an example, the lift carrier 1 inserts the carrier frame 21 from the front of the vehicle 2. In this example, the first arm group 30 holds the front wheels 3 of the vehicle 2, and the second arm group 50 holds the rear wheels 4 of the vehicle 2 to support the vehicle 2. Alternatively, the lift carrier 1 can also support the vehicle 2 after inserting the carrier frame 21 from the rear of the vehicle 2. The lift carrier 1 lifts the carrier frame 21 and moves with the vehicle 2 lifted from a road surface 5 to transport the vehicle 2.

The operation of holding the front and rear wheels (four wheels) 3, 4 of the vehicle 2 by the first arm group 30 and the second arm group 50 is implemented by first arm actuators 32 and second arm actuators 52, respectively. The first arm group 30 includes fixed arms 34, 36 and movable arms 38, 40. The fixed arm 34 and the movable arm 38 form a pair, and the fixed arm 36 and the movable arm 40 form a pair, each pair holding the front wheel 3 therebetween (more specifically, holding the front and rear of the tire tread). The fixed arms 34, 36 are fixed so as to project in the Y direction from the carrier frame 21. Therefore, the front wheels 3 are held and released according to the movement of the movable arms 38, 40. The movable arms 38, 40 are moved by the first arm actuators 32. More specifically, the movable arms 38, 40 are fixed to the carrier frame 21 such that they can rotate within a predetermined range about their one ends. The first arm actuators 32 operate so that the lift carrier 1 (first arm group 30) switches between the supporting state in which the fixed arms 34, 36 and the movable arms 38, 40 hold the front wheels 3 therebetween and the releasing state in which the front wheels 3 are released. The lift carrier 1 switches to the supporting state by aligning the axial directions of the movable arms 38, 40 with the Y direction, and to the releasing state by aligning the axial directions of the movable arms 38, 40 with the X direction.

The second arm group 50 includes movable arms 54, 56, 58, and 60. The movable arms 54, 58 form a pair, and the movable arms 56, 60 form a pair, each pair holding the rear wheel 4 therebetween. The movable arms 54, 56, 58, and 60 are moved by the separate second arm actuators 52. More specifically, the movable arms 54, 56, 58, and 60 are fixed to the carrier frame 21 such that they can rotate within a predetermined range about their one ends. The second arm actuators 52 operate so that the lift carrier 1 (the second arm group 50) switches between the supporting state in which the movable arms 54, 56, 58 and 60 hold the rear wheels 4 therebetween and the releasing state in which the rear wheels 4 are released. The lift carrier 1 switches to the supporting state by aligning the axial directions of the movable arms 54, 56, 58, and 60 with the Y direction, and to the releasing state by aligning the axial directions of the movable arms 54, 56, 58, and 60 with the X direction.

2. Supporting/Releasing Operation and Lifting Operation for Vehicle to be Transported by Lift Carrier Next, a supporting/releasing operation and a lifting operation that are related to transport of the vehicle 2 by the lift carrier 1 according to the present embodiment will be described with reference to FIGS. 2 to 5. An example in which the lift carrier 1 inserts the carrier frame 21 from the front of the vehicle 2 will be described.

Figure 2:
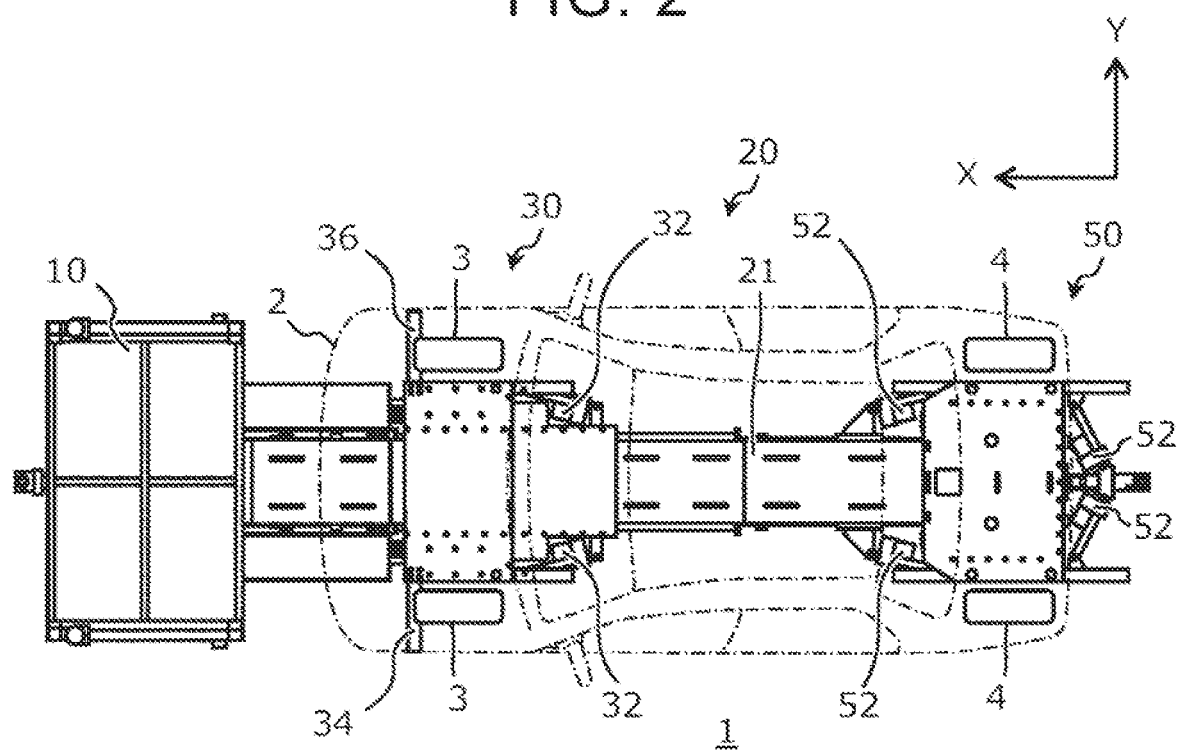
FIG. 2 is a top view of the lift carrier in a releasing state, namely with front and rear wheels of a vehicle to be transported not being supported by a first arm group and a second arm group.
Figure 3:
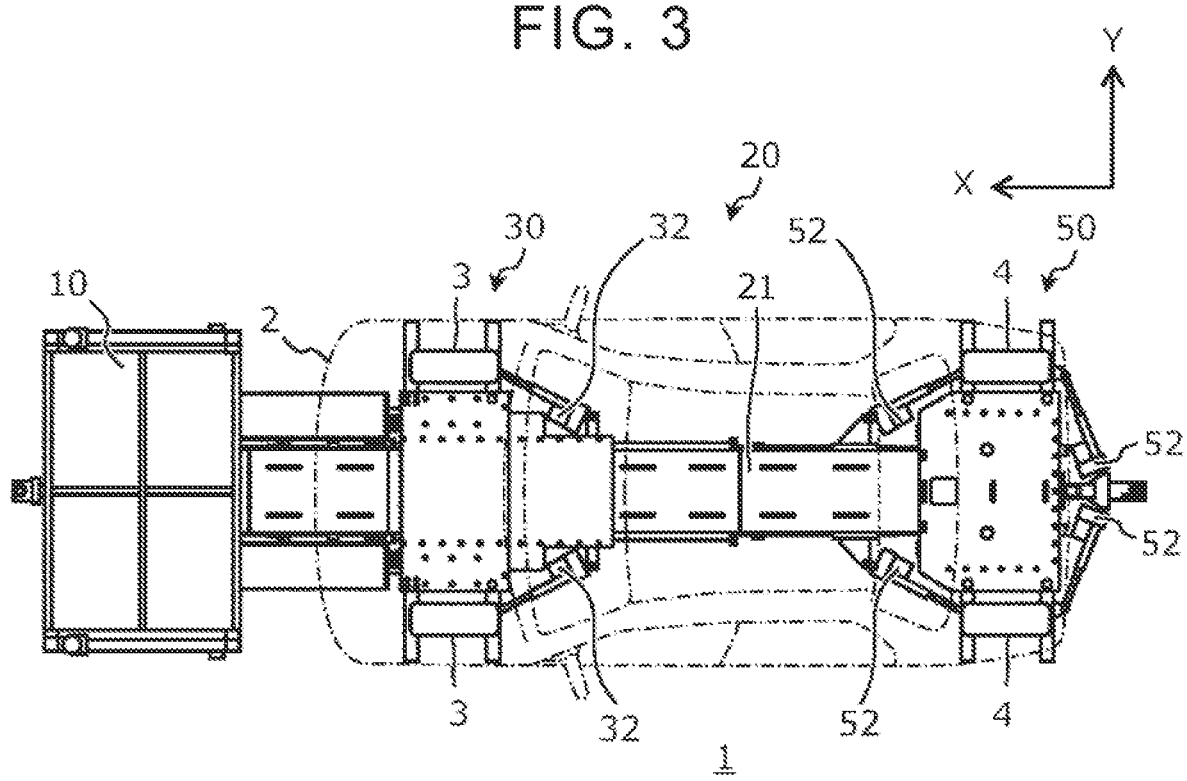
FIG. 3 is a top view of the lift carrier in a supporting state, namely with the front and rear wheels of the vehicle to be transported being supported by the first arm group and the second arm group.

FIG. 2 is a top view of the lift carrier 1 in the releasing state, namely with the front and rear wheels 3, 4 of the vehicle 2 not supported by the first arm group 30 and the second arm group 50. FIG. 3 is a top view of the lift carrier 1 in the supporting state, namely with the front and rear wheels 3, 4 of the vehicle 2 supported by the first arm group 30 and the second arm group 50. In FIGS. 2 and 3, the vehicle 2 is shown in a transparent manner by long dashed short dashed lines.

As shown in FIG. 2, the lift carrier 1 inserts the carrier frame 21 under the vehicle 2 from the front of the vehicle 2 with both the first arm group 30 and the second arm group 50 in the releasing state. At this time, the lift carrier 1 inserts the carrier frame 21 until the fixed arms 34, 36 are in contact with the front wheels 3 of the vehicle 2. That is, the fixed arms 34, 36 function as guides for determining the insertion position of the carrier frame 21. As shown in FIG. 3, the first arm group 30 and the second arm group 50 are then switched to the supporting state, so that the first arm group 30 and the second arm group 50 hold the front and rear wheels 3, 4 of the vehicle 2, respectively.

Figure 4:
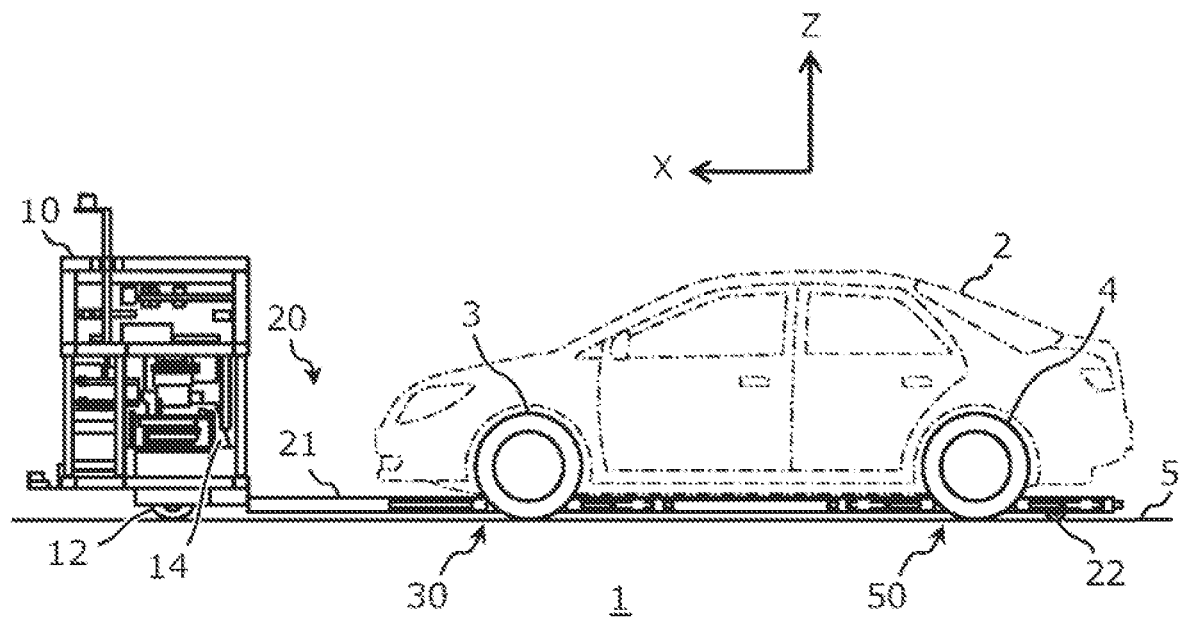
FIG. 4 is a side view of the lift carrier with the vehicle to be transported not being lifted (lowered state)
Figure 5:
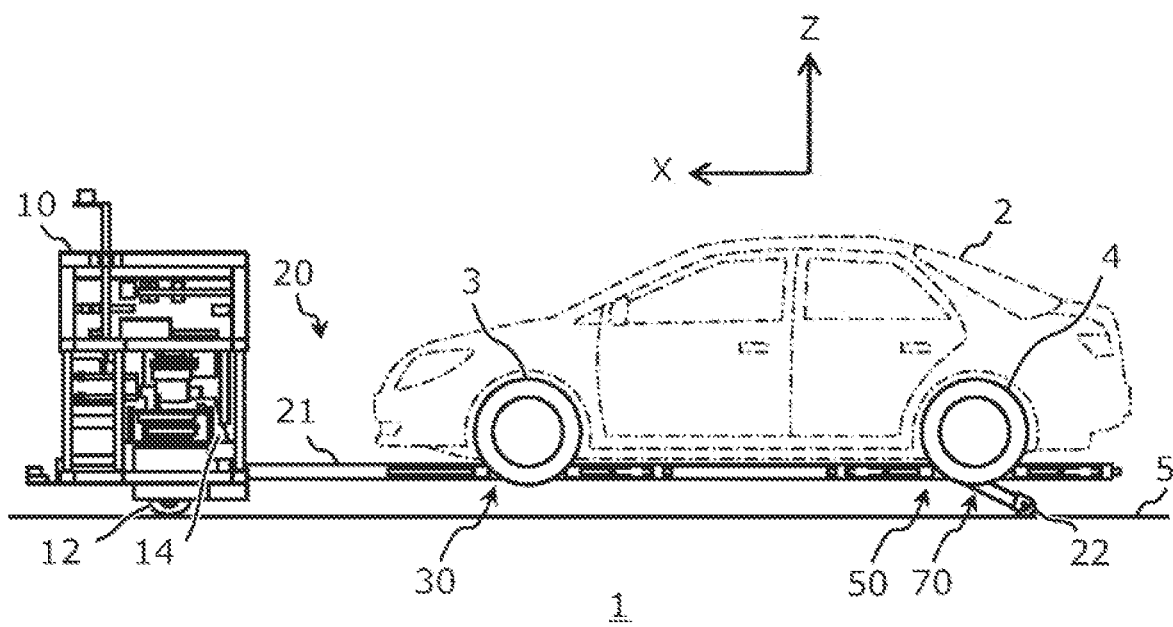
FIG. 5 is a side view of the lift carrier with the vehicle to be transported being lifted (lifted state)

FIG. 4 is a side view of the lift carrier 1 with the vehicle 2 not lifted (lowered state). FIG. 5 is a side view of the lift carrier 1 with the vehicle 2 lifted (lifted state). As shown in FIG. 4, in order to lift the vehicle 2 from the road surface 5 and support the vehicle 2, the lift carrier 1 first holds the front and rear wheels 3, 4 of the vehicle 2 by the first arm group 30 and the second arm group 50, respectively. Next, as shown in FIG. 5, the lift carrier 1 lifts the vehicle 2 by lifting the carrier frame 21 by the first lifting device 14 and the second lifting device 70. The second lifting device 70 is a device for lifting and lowering a rear end portion of the carrier frame 21. The second lifting device 70 will be described later in detail with additional reference to FIGS. 6 to 9.

As shown in FIG. 5, the carrier body 20 is equipped with rear carrier wheels 22 of the lift carrier 1. With the second lifting device 70 described below, the rear carrier wheels 22 can remain in contact with the road surface 5 when the carrier frame 21 is lifted. The lift carrier 1 transports the vehicle 2 as the travelling unit 10 moves (for example moves forward) with the vehicle 2 lifted from the road surface 5. Thereafter, when the lift carrier 1 with the vehicle 2 thereon arrives at the destination, the lift carrier 1 performs the opposite operation to the operation described above. That is, the first lifting device 14 and the second lifting device 70 first lower the carrier frame 21. As a result, the front and rear wheels 3, 4 of the vehicle 2 come into contact with the ground. Next, the first arm actuators 32 and the second arm actuators 52 release the front and rear wheels 3, 4. The vehicle 2 can thus be unloaded from the carrier body 20 at a predetermined position in the destination (transport destination), and the transport of the vehicle 2 is completed.

3. Second Lifting Device (Pair of Lifting Units) and Configuration Around it

Figure 6:
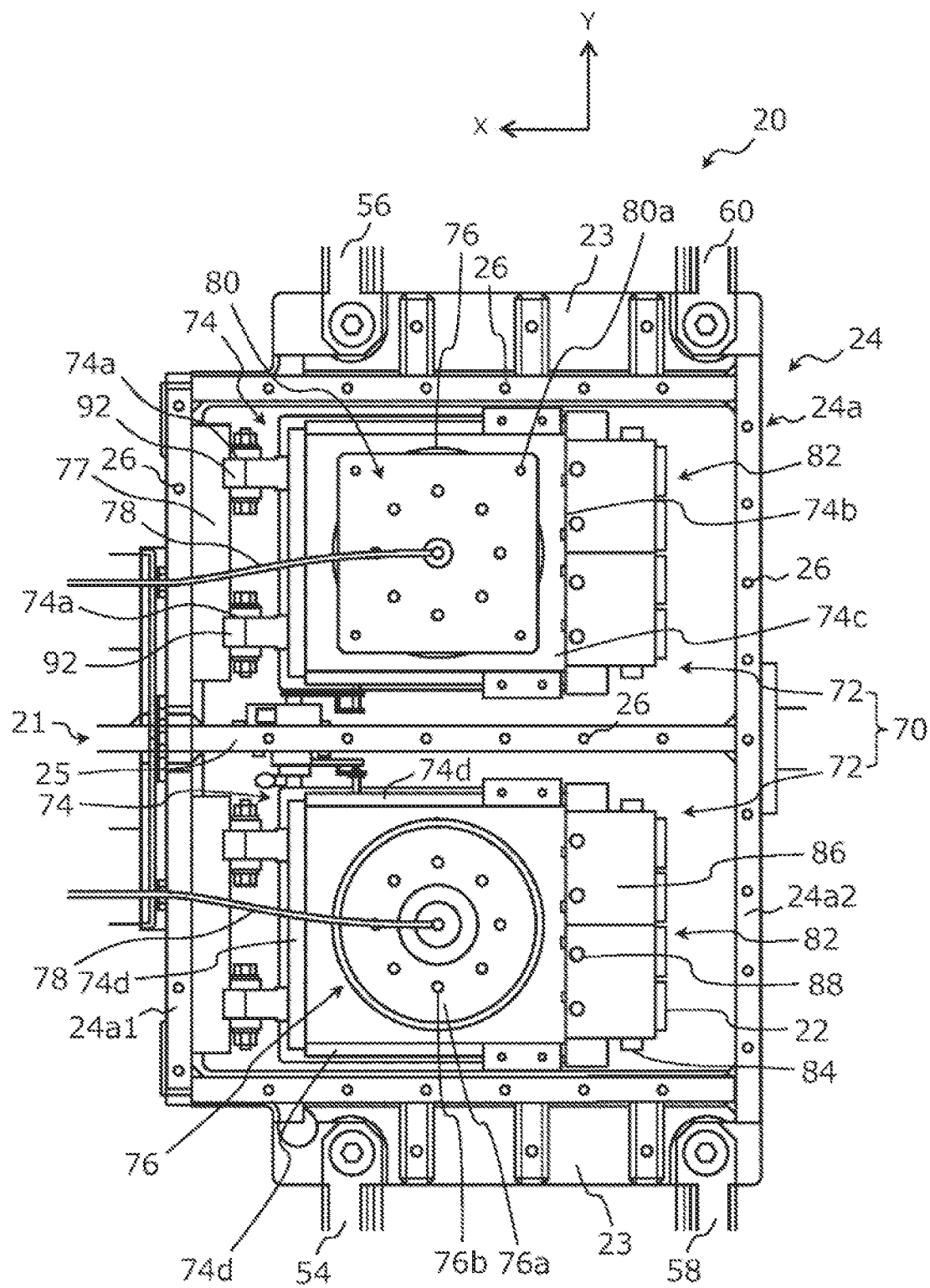
FIG. 6 is a top view showing the configuration of the lift carrier around a second lifting device according to the embodiment.
Figure 7:
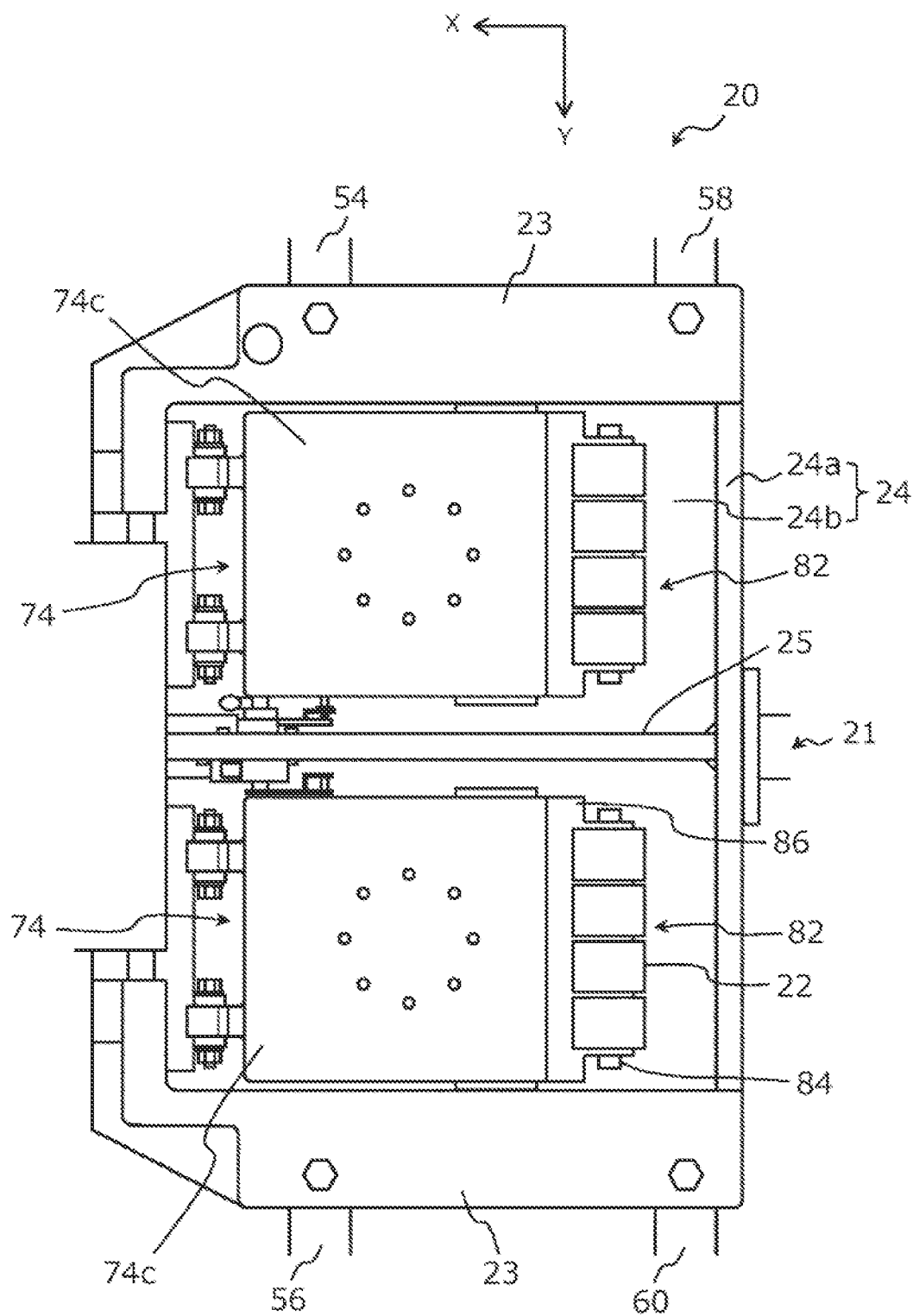
FIG. 7 is a bottom view showing the configuration of the lift carrier around the second lifting device according to the embodiment.
Figure 8:
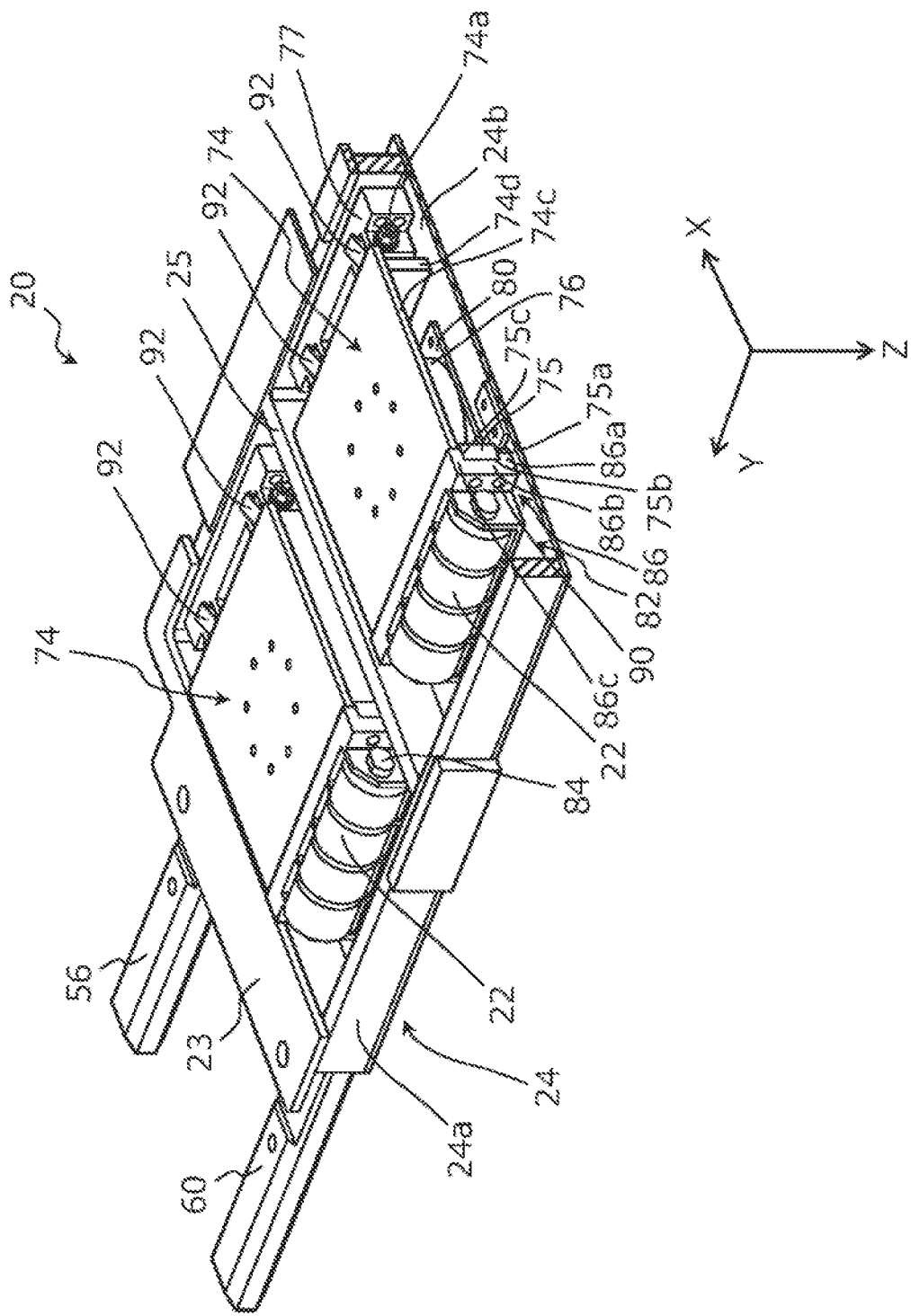
FIG. 8 is a perspective sectional view showing a pair of lifting units in the lowered state shown in FIG. 4.
Figure 9:
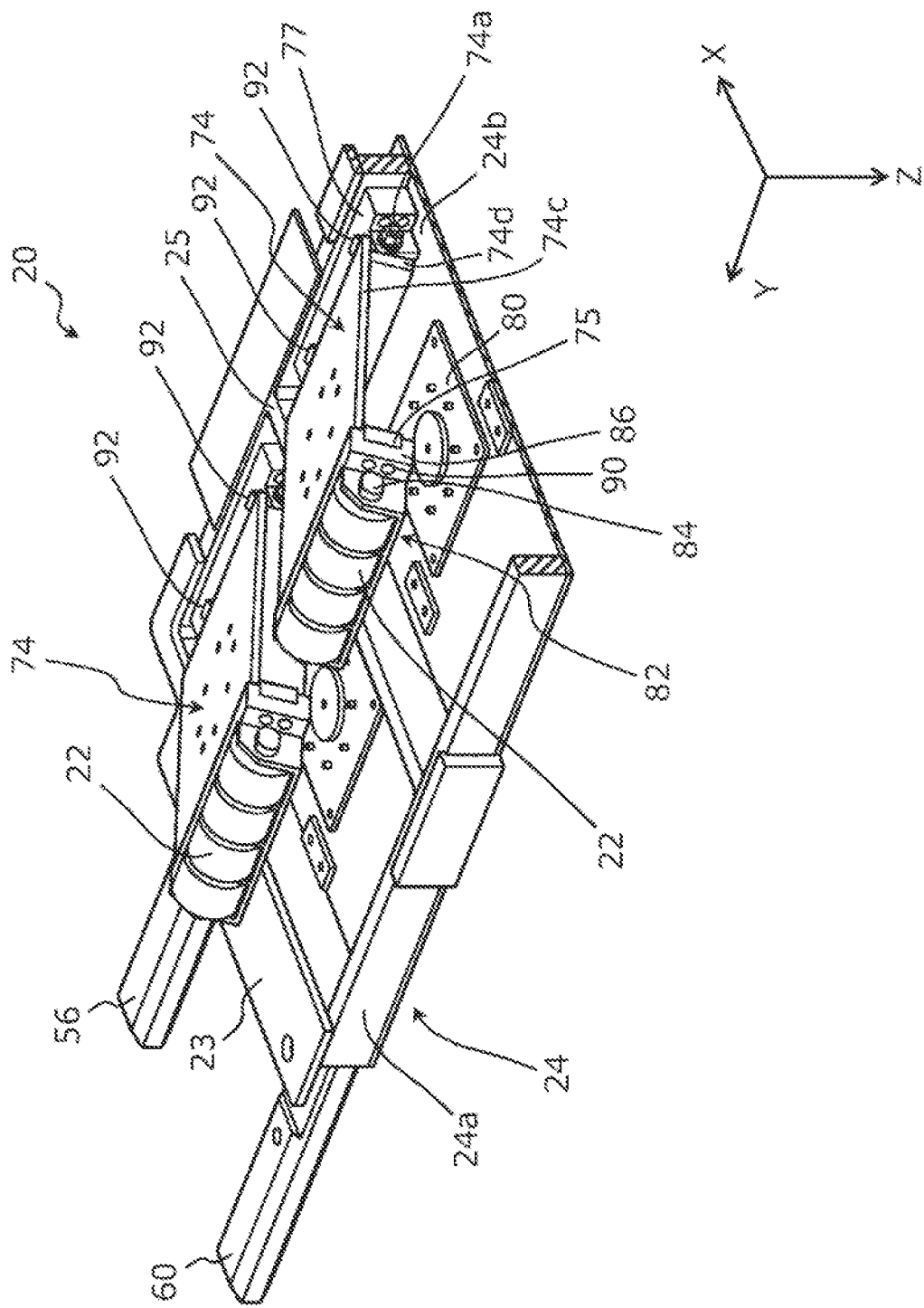
FIG. 9 is a perspective sectional view showing the lifting units in the lifted state shown in FIG. 5.

Hereinafter, the second lifting device 70 and the configuration around it will be described with reference to FIGS. 6 to 9 together with FIGS. 1 to 5. FIGS. 6 and 7 are top and bottom views showing the configuration of the lift carrier 1 around the second lifting device 70 according to the present embodiment, respectively. FIG. 8 is a perspective sectional view showing the lifting units 72 in the lowered state shown in FIG. 4. FIG. 9 is a perspective sectional view showing the lifting units 72 in the lifted state shown in FIG. 5. An upper plate 24b is not shown in FIG. 6. A load distribution plate 80 of the lower lifting unit 72 in the figure is not shown in FIG. 6, either. Air springs 76 are not shown in FIG. 9. A right part of a side wall 74d of a right wheel support 74 in the figure is not shown in FIGS. 8 and 9.

As described above with reference to FIGS. 1 to 5, in the present embodiment, the two rear wheels 4, namely the right and left rear wheels 4, of the vehicle 2 to be transported are an example the "first wheel" according to the present disclosure. The second arm group 50 is supported by the carrier frame 21 via arm support plates 23. More specifically, as shown in FIG. 6, the arm support plates 23 are connected to a frame-shaped structure 24. The frame-shaped structure 24 is a part of the carrier frame 21 that is a structure of the carrier body 20. The arm support plates 23 are joined to the frame-shaped structure 24 by a joining method such as bolt fastening and welding. The frame-shaped structure 24 is a part of the carrier frame 21 that is located between the front pair of second arm actuators 52 in the X direction and the rear pair of second arm actuators 52 in the X direction, as viewed in the X direction.

The combination of the second arm group 50 that is driven by the second arm actuators 52 and the arm support plates 23 joined to the carrier frame 21 is an example of the "pair of wheel support mechanisms" that supports the right and left rear wheels 4 according to the present disclosure.

The second lifting device 70 is configured to lift and lower the pair of wheel support mechanisms (second arm group 50 and arm support plates 23) via the frame-shaped structure 24.

Specifically, the second lifting device 70 includes two lifting units 72. The frame-shaped structure 24 includes a frame portion 24a and an upper plate 24b (see, e.g., FIG. 1) located on the upper side of the carrier body 20 in the Z direction and covering the frame portion 24a. As shown in FIG. 6, the frame portion 24a is, for example, in the shape of a quadrangular frame. The frame-shaped structure 24 is open on the lower side of the carrier body 20 in the Z direction (see, e.g., FIG. 9).

The upper plate 24b is fastened to the frame portion 24a and a reinforcing member 25 by using, for example, bolt holes 26 formed in each of the frame portion 24a and the reinforcing member 25. The reinforcing member 25 will be described later. However, the frame portion 24a and the upper plate 24b need not necessarily be separate parts, and may be an integral part.

In the example shown in FIG. 6, the two lifting units 72 are a pair of lifting units corresponding to the pair of wheel support mechanisms (second arm group 50 and arm support plates 23) and the two lifting units 72 are located next to each other in the Y direction (lateral direction of the carrier body 20). More specifically, the lifting units 72 are located among the movable arms 54, 56, 58 and 60 of the second arm group 50 as viewed in the Y direction. Each of the lifting units 72 includes a wheel support 74 and an air spring 76.

One ends (base ends) 74a of the wheel supports 74 are rotatably supported by the frame portion 24a. More specifically, the one ends 74a are supported by rotation support portions 77 included in the frame portion 24a. Although in the example shown in FIG. 6, the rotation support portions 77 are members separate from the frame portion 24a, the rotation support portions 77 may be integral with the frame portion 24a. The axis of rotation of each wheel support 74 about its one end 74a is parallel to the Y direction. The rear carrier wheels 22 (corresponding to the "second wheel" according to the present disclosure) are connected to the other ends (tip ends) 74b of the wheel supports 74. As shown in FIG. 8, the wheel supports 74 together with the rear carrier wheels 22 can be housed inside the frame-shaped structure 24.

The air springs 76 are interposed between the upper plate 24b and the wheel supports 74. Compressed air is supplied to the air springs 76 via air pipes 78. An air pump (not shown) that supplies compressed air to each air spring 76 is mounted on, for example, the travelling unit 10. The air pump is, for example, an electric air pump. The pressure of the compressed air supplied to each air spring 76 is controlled by, for example, the control device provided at the travelling unit 10.

The air springs 76 expand and contract in the Z direction according to the pressure of the supplied compressed air, and generate a spring force for lifting and lowering the carrier frame 21. In other words, the air springs 76 are pneumatic actuators for lifting and lowering the carrier frame 21.

As an example, the air springs 76 are accordion-shaped bellows air springs. As shown in the lower lifting unit 72 in FIG. 6, each air spring 76 has a cylindrical shape. Upper end faces 76a of the air springs 76 in the Z direction are fastened to load distribution plates 80 using bolt holes 76b. The load distribution plates 80 are fastened to the upper plate 24b by using bolt holes 80a located at the four corners of each load distribution plate 80. Lower end faces (not shown) of the air springs 76 in the Z direction are fastened to bottom walls 74c of the wheel supports 74. The air springs 76 may be directly fastened to the upper plate 24b. However, in the present embodiment, the load distribution plates 80 are interposed between the upper plate 24b and the air springs 76 in order to increase the pressure receiving area of the upper plate 24b. Each load distribution plate 80 is a quadrangular plate, and has a larger surface area than the upper end face 76a of the air spring 76. The load applied from the air springs 76 to the upper plate 24b can therefore be suitably distributed using the load distribution plates 80.

The frame-shaped structure 24 of the carrier frame 21 includes the reinforcing member 25. The reinforcing member 25 extends in the X direction (longitudinal direction of the carrier body 20) between the lifting units 72. The reinforcing member 25 connects a front part 24a1 and a rear part 24a2 of the frame portion 24a in the X direction. Each of the lifting units 72 is located in a corresponding one of two spaces inside the frame portion 24a that are separated by the reinforcing member 25 in the Y direction.

Each wheel support 74 includes the bottom wall 74c and a side wall 74d, and is open on the side of the upper plate 24b. One end of the air spring 76 is fixed to the bottom wall 74c. The side wall 74d surrounds the air spring 76. More specifically, the side wall 74d surrounds the air spring 76 from all sides. The rear carrier wheels 22 (second wheel) are connected to the side walls 74d.

When the vehicle 2 to be transported is not lifted from the road surface 5 by the carrier body 20 (lowered state), the wheel supports 74 together with the rear carrier wheels 22 (second wheel) are housed inside the frame-shaped structure 24 as shown in FIG. 8. When the air springs 76 expands in this lowered state, the wheel supports 74 rotate about their one ends 74a. As a result, the wheel supports 74 together with the rear carrier wheels 22 (second wheel) are deployed out of the frame-shaped structure 24. More specifically, the wheel supports 74 and the rear carrier wheels 22 are deployed downward in the Z direction. FIG. 9 shows the wheel supports 74 and the rear carrier wheels 22 being deployed in this manner. That is, FIG. 9 shows the state when the vehicle 2 is lifted from the road surface 5 by the carrier body 20 (lifted state).

Each wheel support 74 includes a wheel unit 82. The configuration of the wheel unit 82 includes the rear carrier wheels 22 (second wheel), a wheel axle 84 of the rear carrier wheels 22, and a wheel axle support member 86 that supports the wheel axle 84. The wheel unit 82 is fastened to a wheel fastening wall 75 by fasteners (e.g., bolts) 88, 90. The wheel fastening wall 75 is a part of the side wall 74d of the wheel support 74. For example, each wheel unit 82 includes four rear carrier wheels 22. However, each wheel unit 82 may include three or less rear carrier wheels 22, or five or more rear carrier wheels 22. The rear carrier wheels 22 of the wheel units 82 (eight rear carrier wheels 22 in total) are arranged in a row as shown in FIG. 7.

Next, a specific example of the structure for fastening the wheel unit 82 to the wheel fastening wall 75 will be described in more detail. The wheel fastening wall 75 is in the shape of a rectangular parallelepiped extending in the direction of the wheel axle 84 (Y direction). The wheel axle support member 86 has a U-shape (in other words, a C-shape) having an upper wall 86a, a side wall 86b, and a bottom wall 86c, as viewed in a sectional view perpendicular to the wheel axle 84. The upper wall 86a, the side wall 86b, and the bottom wall 86c are in contact with an upper surface 75a, outer side surface 75b, and a bottom surface 75c of the wheel fastening wall 75, respectively.

Then, the fasteners 88 fasten the upper wall 86a of the wheel axle support member 86 to the wheel fastening wall 75. The fasteners 90 fasten the side wall 86b of the wheel axle support member 86 to the wheel fastening wall 75. A plurality of (e.g., four) fastening positions at which the wheel axle support member 86 is fastened by the fasteners 88 is located along the entire width of the wheel axle support member 86 in the Y direction. A plurality of fastening positions at which the wheel axle support member 86 is fastened by the fasteners 90 is located at the two ends of the wheel axle support member 86 in the Y direction (e.g., two fastening positions are located in each end). The fasteners 88, 90 are examples of the "first fastener" and the "second fastener" according to the present disclosure, respectively. Since the fastening positions of the fasteners 88 are at the upper wall 86a rather than at the bottom wall 86c, the wheel unit 82 can be easily replaced from above in the Z direction with the lift carrier 1 placed on the road surface 5. However, the fastening positions of the fasteners 88 (first fastener) need not necessarily be at the upper wall 86a, and may be at the bottom wall 86c or at both the upper wall 86a and the bottom wall 86c.

Each wheel support 74 further includes a stopper 92 (see FIGS. 6, 8, and 9). The stopper 92 is located at the one end 74a of the wheel support 74 that is rotatably supported by the frame portion 24a. As is well illustrated in FIG. 8, the stopper 92 has a claw shape. The stopper 92 engages with the frame portion 24a (rotation support portion 77) when the rotation angle of the wheel support 74 with respect to the frame-shaped structure 24 reaches a predetermined angle as the air spring 76 expands. When the stopper 92 engages with the frame portion 24a, further rotation of the wheel support 74 is restricted. The predetermined angle herein refers to the rotation angle of the wheel support 74 when the wheel support 74 is rotated to a rotation angle larger than the rotation angle of the wheel support 74 in the lifted state shown in FIG. 9.

4. Effects

According to the lifting unit 72 included in the lift carrier 1 described above, the one end 74a of the wheel support 74 that supports the one end (lower end) of the air spring 76 is rotatably supported by the frame portion 24a of the strong frame-shaped structure 24 that is a part of the structure (carrier frame 21) of the carrier body 20. The other end 74b of the wheel support 74 is connected to the rear carrier wheels 22 (second wheel). The wheel support 74 can be housed inside the frame-shaped structure 24. As the air spring 76 expands, the wheel support 74 is rotated about its one end 74a, and is, together with the rear carrier wheels 22 (second wheel), deployed out of the frame-shaped structure 24. This structure can provide sufficient rigidity around the lifting unit 72 while making the lifting unit 72 compact. Moreover, since the air springs 76 are used to lift and lower the carrier frame 21, the air springs 76 can not only have a lifting function but also a suspension function for the carrier body 20 on which the vehicle 2 to be transported is placed.

The frame-shaped structure 24 includes the reinforcing member 25. The reinforcing member 25 extends in the X direction (longitudinal direction of the carrier body 20) between the lifting units 72, and connects the front part 24a1 and the rear part 24a2 of the frame portion 24a in the X direction. This structure can efficiently further increase the rigidity around the lifting unit 72 while keeping the lifting unit 72 compact. Moreover, the pair of lifting units 72 each using the air spring 76 is provided so as to correspond to the pair of wheel support mechanisms (second arm group 50 and arm support plates 23). Accordingly, each of the lifting units 72 can operate independently in response to the input applied from the road surface 5 to the lift carrier 1 while the lift carrier 1 is moving. This can improve the suspension performance as compared to an example in which the lift carrier includes only one lifting unit.

Each wheel support 74 includes the bottom wall 74c to which the one end of the air spring 76 is fixed, and the side wall 74d surrounding the air spring 76. The rear carrier wheels 22 (second wheel) are connected to the side wall 74d. The wheel support 74 having such a box shape has improved support rigidity for the air spring 76 and the rear carrier wheels 22 (second wheel).

Each wheel support 74 further includes the wheel unit 82. The configuration of the wheel unit 82 includes the rear carrier wheels 22 (second wheel), the wheel axle 84 of the rear carrier wheels 22, and the wheel axle support member 86 that supports the wheel axle 84. The wheel unit 82 is fastened to the wheel fastening wall 75 that is a part of the side wall 74d of the wheel support 74 by the fasteners 88, 90. According to such a structure, the entire wheel unit 82 can be removed. This configuration can improve the serviceability regarding replacement of the rear carrier wheels 22 (second wheel).

The wheel axle support member 86 of the wheel unit 82 has a U-shape that fits in the wheel fastening wall 75 having the shape of a rectangular parallelepiped extending in the direction of the wheel axle 84. The upper wall 86a of the wheel axle support member 86 is fastened to the wheel fastening wall 75 by the fasteners 88, and the side wall 86b of the wheel axle support member 86 are fastened to the wheel fastening wall 75 by the fasteners 90. This structure improves the fastening strength of the wheel unit 82 to the wheel support 74.

Each wheel support 74 further includes the stopper 92. The stopper 92 is formed at the one end 74a of the wheel support 74 rotatably supported by the frame portion 24a. The stopper 92 engages with the frame portion 24a when the rotation angle of the wheel support 74 with respect to the frame-shaped structure 24 reaches the predetermined angle as the air spring 76 expands. The stopper 92 thus restricts further rotation of the wheel support 74. This structure can prevent excessive expansion of the air spring 76.

The lift carrier 1 according to the above embodiment includes two lifting units 72. However, the "lift carrier" according to the present disclosure may include one lifting unit or three or more lifting units.

What is claimed is:

1. A lift carrier that lifts, from a surface, a vehicle to be transported, the lift carrier comprising:
a pair of wheel support mechanisms that supports a pair of wheels of the vehicle;
a frame structure connected to the pair of wheel support mechanisms; and
a lifting unit that lifts or lowers the pair of wheel support mechanisms via the frame structure, wherein:
the frame structure includes:
a frame portion; and
an upper plate;
the lift unit includes
a wheel support including:
a bottom wall;

a side wall;
a wheel axle of a carrier wheel;
a wheel axle support member that supports the wheel axle, the wheel axle support member has a U-shape including an upper wall, a side wall, and a bottom wall, as viewed in a sectional view perpendicular to the wheel axle, the upper wall being in contact with an upper surface of a wheel fastening wall, the side wall being in contact with an outer side surface of the wheel fastening wall, and the bottom wall being in contact with a bottom surface of the wheel fastening wall; and
a wheel unit fastened to the wheel fastening wall by a fastener, the fastener includes a first fastener that fastens at least one of the upper wall and the bottom wall of the wheel axle support member to the wheel fastening wall, and a second fastener that fastens the side wall of the wheel axle support member to the wheel fastening wall, the wheel fastening wall being a part of the side wall of the wheel support, the wheel fastening wall is in a shape of a rectangular parallelepiped extending in a direction of the wheel axle, the wheel unit including the carrier wheel, the carrier wheel being connected to the side wall of the wheel support, the carrier wheel being one or more wheels of a carrier body, and
a spring configured to expand and contract, one end of the spring is fixed to the bottom wall of the wheel support, the spring is surrounded by the side wall of the wheel support.

2. The lift carrier according to claim 1, wherein:
lifting unit includes a pair of lifting units corresponding to the pair of wheel support mechanisms and arranged next to each other in a lateral direction of the carrier body; and
the frame structure includes a reinforcing member extending in a longitudinal direction of the carrier body between the pair of lifting units and connecting a front part of the frame portion and a rear part of the frame portion in the longitudinal direction.

3. The lift carrier according to claim 2, wherein the pair of lifting units are separated by the reinforcing member in the lateral direction.

4. The lift carrier according to claim 1, wherein the first fastener fastens the upper wall of the wheel axle support member to the wheel fastening wall.

5. The lift carrier according to claim 1, wherein the wheel support further includes a stopper that is located at one end of the wheel support rotatably supported by the frame portion, and the stopper engages with the frame portion when a rotation angle of the wheel support with respect to the frame structure reaches a predetermined angle as the spring expands.

6. The lift carrier according to claim 5, wherein the stopper has a claw shape.

7. The lift carrier according to claim 5, wherein, when the stopper engages with the frame portion, further rotation of the wheel support is restricted.

8. The lift carrier according to claim 1, wherein the pair of wheels of the vehicle are a right wheel and a left wheel of the vehicle.

9. The lift carrier according to claim 1, wherein the upper plate is located on an upper side of the carrier body and covers the frame portion.

10. The lift carrier according to claim 9, wherein the frame structure is open on a lower side of the carrier body.

11. The lift carrier according to claim 1, wherein the wheel support includes one end rotatably support by the frame portion.

12. The lift carrier according to claim 11, wherein the wheel support includes another end to which the carrier wheel is connected.

13. The lift carrier according to claim 12, wherein the wheel support is configured to be housed, together with the carrier wheel, inside the frame structure.

14. The lift carrier according to claim 11, wherein the spring is interposed between the wheel support and the upper plate.

15. The lift carrier according to claim 14, wherein the spring is an air spring and is configured to expand and contract according to a pressure of compressed air supplied to the air spring.

16. The lift carrier according to claim 15, wherein, as the air spring expands, the wheel support is rotated about the one end and is, together with the carrier wheel, deployed out of the frame structure.

17. The lift carrier according to claim 15, wherein the air spring is a pneumatic actuator including an accordion-shaped bellows.

18. The lift carrier according to claim 14, wherein an upper end of the spring is fastened to the upper plate by bolt holes.

19. The lift carrier according to claim 14, wherein a lower end of the spring is fastened to the wheel support.

* * * * *